US005133443A

United States Patent [19]

Johnson et al.

[11] Patent Number: 5,133,443

[45] Date of Patent: Jul. 28, 1992

[54] SELF ADJUSTABLE ESCALATOR HANDRAIL DRIVE WITH BALANCED DRIVE CHAIN TENSION

[75] Inventors: Gerald E. Johnson, Farmington; James A. Rivera, Bristol, both of Conn.

[73] Assignee: Otis Elevator Company, Farmington, Conn.

[21] Appl. No.: 669,794

[22] Filed: Mar. 15, 1991

[51] Int. Cl.[5] ........ B65G 15/00

[52] U.S. Cl. ........ 198/335

[58] Field of Search ........ 198/330, 331, 335, 835

[56] References Cited

U.S. PATENT DOCUMENTS

| | | | |
|---|---|---|---|
| 3,414,109 | 12/1968 | Clark | 198/335 |
| 3,653,484 | 4/1972 | Taylor | 198/335 |
| 3,666,075 | 5/1972 | Iwata | 198/335 |
| 3,712,447 | 1/1973 | Boltrek et al. | 198/335 |
| 3,779,360 | 12/1973 | Taher et al. | 198/835 X |
| 4,134,883 | 1/1979 | Mendelsohn | 198/335 X |
| 4,200,177 | 4/1980 | Sato et al. | 198/335 |
| 4,589,539 | 5/1986 | Boltrek et al. | 198/331 |
| 4,674,619 | 6/1987 | Nakazawa et al. | 198/331 |
| 4,875,569 | 10/1989 | Hermann et al. | 198/335 |
| 4,895,240 | 1/1990 | Bruehl et al. | 198/331 |
| 4,901,839 | 2/1990 | Johnson et al. | 198/335 |
| 4,998,613 | 3/1991 | Rivera et al. | 198/335 |
| 5,018,616 | 5/1991 | Johnson et al. | 198/335 |

FOREIGN PATENT DOCUMENTS

| | | | |
|---|---|---|---|
| 0022686 | 2/1979 | Japan | 198/335 |
| 1123981 | 11/1984 | U.S.S.R. | 198/335 |

*Primary Examiner*—Robert P. Olszewski
*Assistant Examiner*—Cheryl L. Gastineau
*Attorney, Agent, or Firm*—William W. Jones

[57] ABSTRACT

The handrail drive utilizes one or more pairs of drive chain sprockets and idler sprockets which form a nip over which the drive chain moves. The drive chain and idler sprockets are mounted on rotating drive shafts which in turn are eccentrically mounted in rotatable bushings. The drive rollers will automatically tighten on the handrail as friction increases between the rollers and handrail due to increased resistance to movement of the handrail. The rotatable bushings on each drive sprocket and its associated idler sprocket are connected together to ensure that chain tension equalizes between each drive and idler sprocket so that no drive chain slack will occur.

2 Claims, 2 Drawing Sheets

SELF ADJUSTABLE ESCALATOR HANDRAIL DRIVE WITH BALANCED DRIVE CHAIN TENSION

TECHNICAL FIELD

This invention relates to an automatically self-tightening handrail drive assembly which ensures a balanced tension on the drive chain.

BACKGROUND ART

U.S. Pat. No. 4,901,839 granted Feb. 20, 1990 to Gerald E. Johnson and James A. Rivera, which is incorporated herein in its entirety, discloses an escalator, or the like conveyor, moving handrail drive which automatically increases its driving power in response to increased resistance to movement of the handrail. The handrail drive includes a pair of cooperating drive rollers which are mounted in eccentric fashion in a pair of opposed rotatable bearings. The drive rollers form a nip through which the handrail passes. As resistance to movement of the handrail increases, as when the escalator or walkway is fully loaded, frictional forces between the handrail and drive rollers increase. Increased frictional forces between the rollers and handrail causes the eccentric bearings to rotate, which moves the drive rollers closer together thus increasing nip pressure on the handrail. Copending application Ser. No. 609,285 filed Nov. 5, 1990, now U.S. Pat. No. 5,018,616, discloses an embodiment of the aforesaid handrail drive which assures balanced tightening of the handrail drive rollers.

DISCLOSURE OF THE INVENTION

This invention is directed toward a handrail drive of the type described above, which provides for a balanced tension on the drive chain when idler sprockets are incorporated into the drive. In order to achieve the balanced chain tension, the idler sprockets are mounted in their own eccentric rotatable bushings and the rotatable bushings of each drive roller and its associated idler sprocket are physically connected together in such a manner that the bushing which is under a load imposed rotational moment will impose on the other bushing a like rotational moment. The connection can take the form of a transfer link connected to the rotatable bushings, or a like rotational motion transferring connection. With the aforesaid connection between the rotating bushings, the bushing subjected to the rotational load will control the degree of bushing rotation of the idler sprocket bushing by means of the transfer link. In this manner, the bushings will both always pivot through the same or substantially the same included angle and there will be no sag or excessive tension imposed on the chain as it travels from roller sprockets to idler sprockets, and reverse.

It is therefore an object of this invention to provide an escalator handrail drive assembly which includes a pair of rollers providing a nip through which the handrail is moved.

It is a further object of this invention to provide a handrail drive assembly of the character described wherein the rollers will automatically tighten the nip in response to increases in resistance to movement of the handrail.

It is another object of this invention to provide a handrail drive assembly of the character described wherein the degree of chain tension is balanced in the system.

These and other objects and advantages of the invention will become more readily apparent from the following detailed description of two preferred embodiments thereof when taken in conjunction with the accompanying drawings, in which:

BEST MODE FOR CARRYING OUT THE INVENTION

Figure 1:
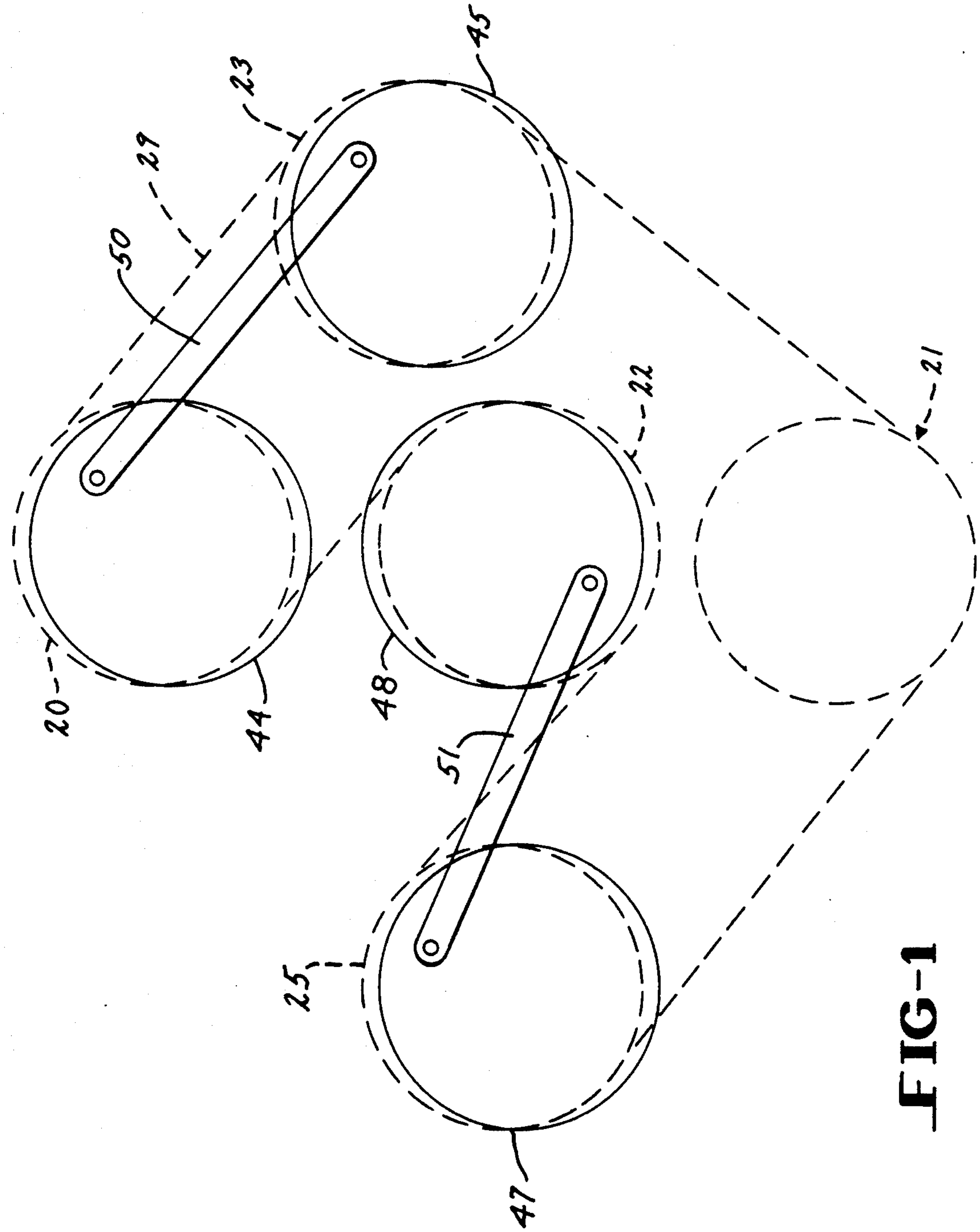
FIG. 1 is a schematic elevational view of the chain sprockets and the eccentric bushings in which they are mounted.

Referring to FIG. 1, there is shown schematically the chain 29, the chain sprockets 20, 21, 22, 23 and 25, and the eccentric bushings 42, 45, 46 and 47 in which the sprocket shafts are mounted. The sprockets 20 and 22 are drive roller sprockets, and are mounted on shafts journaled in eccentric bushings 42 and 46, respectively. The sprocket 21 is a drive or power sprocket, and is not mounted in an eccentric bushing. Sprockets 23 and 25 are idler sprockets over which the chain 29 passes, and are mounted in eccentric bushings 45 and 47, respectively. The eccentric bushings 42 and 45 are connected by a link 50, and the bushings 46 and 47 are connected to each other by a link 51. The links 50 and 51 ensure that load-induced rotation of the roller sprocket bushings 42 and 46 is equally transferred to the idler sprocket bushings 45 and 47. This ensures that no chain sag will occur between the adjacent sprockets.

Figure 2:
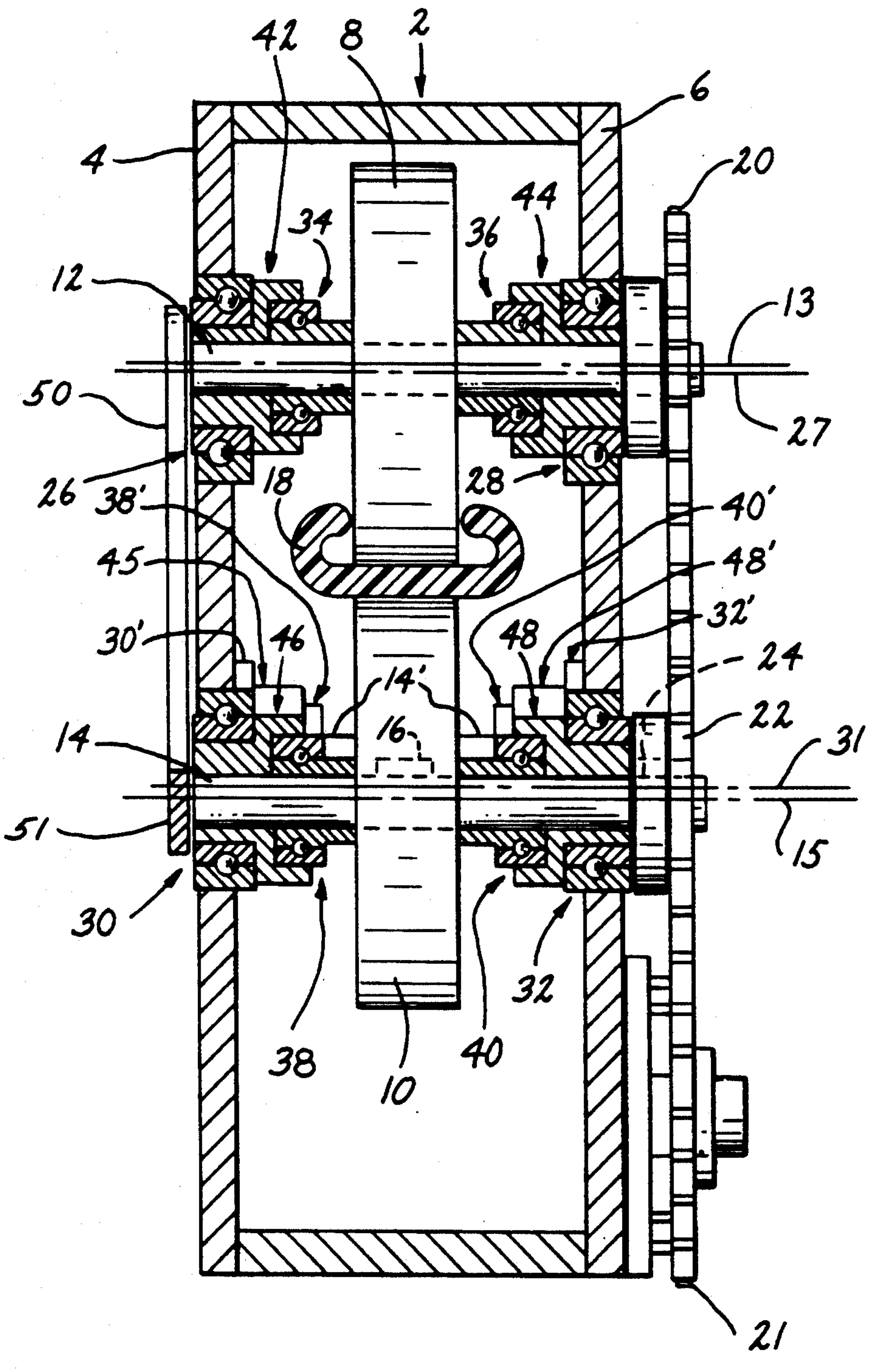
FIG. 2 is a sectional view of the drive assembly of this invention showing the eccentricity of the roller and sprocket shafts, and the shaft and sprocket mount bushings.

Referring now to FIG. 2, the housing for the drive mechanism is denoted by the numeral 2, and includes opposed side walls 4 and 6. Driving rollers 8 and 10 are mounted on shafts 12 and 14, respectively, and are keyed to the shafts by keys 16 (only one of which is shown). The rollers 8 and 10 combine to form a nip through which the handrail 18 passes. Chain sprockets 20 and 22 are secured by keys 24 (only one of which is shown) to the shafts 12 and 14, respectively. The rollers 8, 10, respective shafts 12 and 14, and respective sprockets 20 and 22 thus rotate in concert. Bearings 26 and 28 are mounted in the housing walls 4 and 6, as are bearings 30 and 32. Shaft bearings 34, 36, 38 and 40 are mounted on the shafts 12 and 14, respectively. Bushing 42 interconnects bearings 26 and 34, and similarly bushings 44, 46 and 48 interconnect bearings 28 and 36; 30 and 38; and 32 and 40, respectively. As a result, the shafts 12 and 14 rotate in the bushings 42, 44, 46 and 48, respectively. Additionally, bushings 42, 44, 46 and 48 can rotate within the housing walls 4 and 6 by virtue of the bearings 26, 28, 30 and 32, respectively. Each eccentric bushing and bearing combination forms a rotating bearing assembly for each end of the rotating shafts in the drive assembly.

The idler sprocket bushing 45 is mounted in bearing 30' and carries a second bearing 38 which in turn carries idler sprocket axle 14'. The axle 14' is also journaled in an opposite bearing 40' disposed in an opposite eccentric bushing 48' which rotates in housing wall 6 by reason of a bearing 32'.

In FIG. 2, the mechanism is shown as it appears at rest, i.e., when the sprockets 20 and 22 are not moving and when the handrail 18 is not moving. The axis of the shaft 12 designated by the numeral 13, and the axis of the shaft 14 is designated by the numeral 15. The axes of the bearings 26, 28 and the bushings 42, 44 are designated by the numeral 27 while the axes of the bearings 30, 32 and the bushings 46, 48 are designated by the numeral 31. It will be noted that the axes 13 and 27 are offset, as are the axes 15 and 31, and that the axes 27 and 31 are closer together, and closer to the handrail 18 and nip than are the axes 13 and 15. The device is designed to provide only a very light compression of the handrail 18 by the rollers 8 and 10 when at rest as is shown in FIG. 2. It will be appreciated that the axes 13 and 15 are as far apart as they can be as shown in FIG. 2. The link 50 connects the bushings 42 and 45, as is most clearly shown in FIG. 1.

It will be readily appreciated that the handrail drive assembly of this invention will result in longer handrail operating life while continuing to operate under relatively high drive loads. The balancing of drive chain tension between the drive and idler sprockets helps to create an even division of pressure load components on the handrail.

Since many changes and variations of the disclosed embodiments of the invention may be made without departing from the inventive concept, it is not intended to limit the invention otherwise than as required by the appended claims.

What is claimed is:

1. A handrail drive assembly for a moving handrail, said assembly comprising:

a) a pair of drive roller sprockets mounted on rotatable drive roller shafts, said drive roller sprockets being driven by a chain to rotate a pair of drive rollers forming a nip through which the handrail passes;

b) rotatable end bearing assemblies supporting opposite ends of said drive roller shafts, said end bearing assemblies being mounted eccentrically of said drive roller shafts;

c) a drive sprocket for driving said chain, said drive roller sprockets, said drive rollers and drive roller shafts in said end bearing assemblies whereby the axes of said drive rollers move toward each other due to the eccentricity of said shafts and bearing assemblies, to increase nip pressure on the handrail responsive to resistance to movement of the handrail;

d) a pair of idler sprockets associated with said drive roller sprockets, there being one of said idler sprockets interposed between each of said drive roller sprockets and said drive sprocket to guide said chain between said drive roller sprockets and said drive sprocket, said idler sprockets being mounted on sprocket shafts which are also carried in eccentric rotatable end bearing assemblies; and e) means interconnecting the end bearing assemblies of each of said drive roller shafts with the associated end bearing assemblies of the associated idler sprocket shaft, said means being operable to ensure that each of said drive roller sprocket axes moves through substantially equal included angles as the associated idler sprocket axes when increasing the nip pressure to ensure tautness of the chain at all times during operation of the drive assembly.

2. The handrail drive assembly of claim 1 wherein said means interconnecting is a link having opposite ends pivotally connected to each of said end bearing assemblies.

* * * * *